United States Patent [19]
Schoenky

[11] Patent Number: 5,110,073
[45] Date of Patent: May 5, 1992

[54] FLANGED PIPE SUPPORT

[76] Inventor: John H. Schoenky, 22700 NW. Quatama St., Hillsboro, Oreg. 97124

[21] Appl. No.: 667,827

[22] Filed: Mar. 12, 1991

[51] Int. Cl.[5] .............................................. F16L 3/00
[52] U.S. Cl. ......................................... 248/49; 248/70
[58] Field of Search ....................... 248/49, 58, 62, 59, 248/65, 70; 52/27, 294, 220; 285/61, 62, 63, 64

[56] References Cited

U.S. PATENT DOCUMENTS

| | | | |
|---|---|---|---|
| 981,470 | 1/1911 | Postel | 248/72 X |
| 1,025,243 | 5/1912 | Carpenter | 248/62 X |
| 2,444,701 | 7/1948 | Ingham | 248/62 |
| 2,521,474 | 9/1950 | Morgan | 248/49 X |
| 2,539,783 | 1/1951 | Kirk | 248/62 |
| 2,684,222 | 7/1954 | Miller | 248/49 |
| 4,076,281 | 2/1978 | Davis | 285/64 |
| 4,429,497 | 2/1984 | Dibernardi | 52/27 |

FOREIGN PATENT DOCUMENTS 1122953  5/1987  Canada .................................. 248/49

Primary Examiner—J. Franklin Foss
Attorney, Agent, or Firm—Jack E. Day

[57] ABSTRACT

The present invention is an economical and conveniently installed support for flanged piping where the individual lengths thereof are bolted together. It is intended for use on long, substantially horizontal, runs of piping where it is desired to eliminate stresses on unsupported flanged joints, and is especially useful where valves and other heavy fittings are located between lengths of piping. The support is bolted directly to the bottom arc of the flange, having holes therein which match the holes in the flanges, and is especially useful with piping having Class 125 AWWA flanges. The support has convenient adjustments to compensate for variations in the height between the level of the piping and that of the supporting structure.

2 Claims, 1 Drawing Sheet

FLANGED PIPE SUPPORT

This invention is a pipe support for industrial piping in general and, in particular, is a pipe support for flanged pipe which is held together by bolts or other removable fastenings.

BACKGROUND OF THE INVENTION

Almost from the time that pipes have been used, there have been devices to support them so that undue strain is not placed upon the pipe or couplings. Representative of the various supports that have been used over the years are the following references.

Hazen U.S. Pat. No. 1,034,444 discloses a bracket for supporting downspouts on the outside of buildings, although it could be adapted for supporting industrial piping. It is fastened to an adjustable base, permitting adjustment of the distance between supports. The support itself has a turnbuckle arrangement to adjust the spacing of the downspout from the base (or wall), plus a clamp which holds the downspout in place. It has little relationship to the present invention, except as one example of a support for pipes.

Jenkins U.S. Pat. No. 3,506,227 discloses a support for hanging pipe from an overhead. It has a novel system for adjusting for the diameter of the pipe, and uses a turnbuckle or other arrangement to adjust the length of the support. It has little relationship to the present invention, except as another example of a support for piping.

German patent 29 33 203 discloses a support for piping where the head of a bolt is welded or otherwise attached to the pipe, and the other-threaded-end of the bolt is threaded into a captive nut rotatingly affixed to a bracket which is, in turn, attached to a wall, overhead, or other structure. The bolt also is threaded through another nut which is tightened down on the captive nut when the support holds the pipe a desired distance from the supporting structure, firmly setting the desired spacing. It has little relevance to the present invention, except as illustrating yet a third method of supporting piping.

BRIEF DESCRIPTION OF THE PRESENT INVENTION

The pipe support of the present invention is intended to be used with flanged piping, the individual lengths of which are bolted, or otherwise removably fastened together. It is especially intended for use with piping with Class 125 AWWA flanges, where the pipe is laid horizontally, supported from below, and it is desired to eliminate stresses on unsupported flanged joints.

The support comprises a plate having a concave arcuate shape on the supporting edge, which shape is substantially parallel to the curvature of the pipe to be supported. Spaced from this arcuate edge are two or more holes, which are of a size and spacing to fit the bolt holes of standard pipe flange, for example, Class 125 AWWA flanges. The plate has an adjustment means between it and a base, which is fastened to a foundation sufficiently strong to hold the weight involved.

The preferred embodiment of the adjustment means is as follows. The plate, having a concave arcuate shape in the upper edge, is affixed to a threaded stud, by welding or otherwise. A threaded nut screws onto the stud and has affixed on the bottom edge thereof an inverted first cup, which slidably rotatingly fits over a separator, which is preferably a length of standard pipe of sufficient diameter and thickness to support the weight which will be placed thereon. The other end of the length of pipe slidably rotatingly fits within a second cup welded or otherwise affixed to the base plate fastened to the floor or other foundation.

The flange of the supported pipe is bolted to the arcuate plate, and the length of standard water pipe is selected to support the flanged piping at substantially the desired height above the floor. The nut welded to the inverted first cup is rotated on the threaded stud, by hand turning the first cup if possible, or by wrench applied to the nut, if necessary, for fine height adjustment, as needed.

DETAILED DESCRIPTION OF THE PRESENT INVENTION

Figure 1:
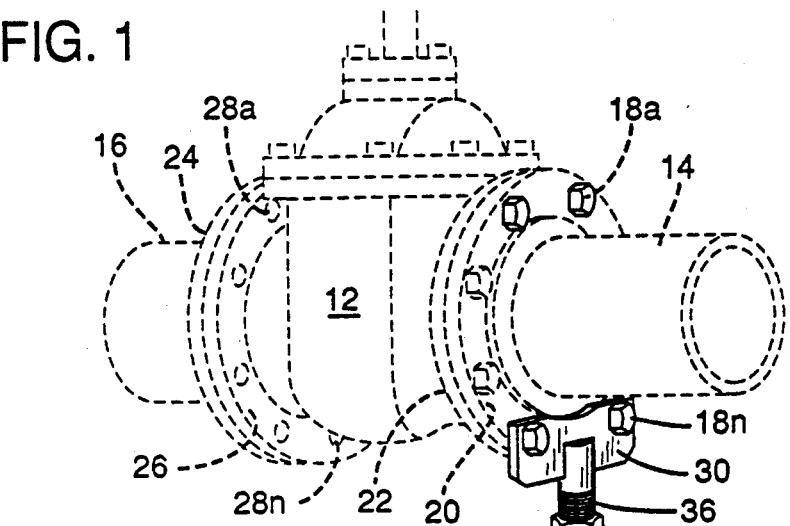
FIG. 1 is an oblique view of the pipe support of the present invention, in place and supporting a heavy valve assembly bolted between two lengths of flanged pipe, which latter are shown in dashed outline.

FIG. 1 discloses an oblique view of flanged piping support 10.

FIG. 1 also discloses a typical piping situation where support 10 is useful. Shown in dashed outline are valve 12 between two lengths 14 and 16 of flanged piping. Support 10 is bolted to first length of pipe 14 by means of bolts 18a–n, which pass through spaced holes (not shown) in flange, and are screwed into threaded holes (not shown) in flange 22 of valve 12. Flange 24 of second length of flanged piping 16 is bolted to flange 26 of valve 12 by bolts (not shown) screwed into threaded holes 28a–n.

It will be seen that the entire weight of valve 20, plus one-half the weight of first and second lengths of pipes 14 and 16, respectively, are carried by support 10 (assuming that the unseen ends of lengths 14 and 16 are supported by other supports 10).

Those skilled in the art know that the flanging on such piping is manufactured to an industry standard, in that the thickness and width of the flanges, the size and spacing of the holes therein, as well as the bolt and thread size, are specified for each size of pipe. One such standard is AWWA Class 125 (American Water Works Association).

Figure 2:
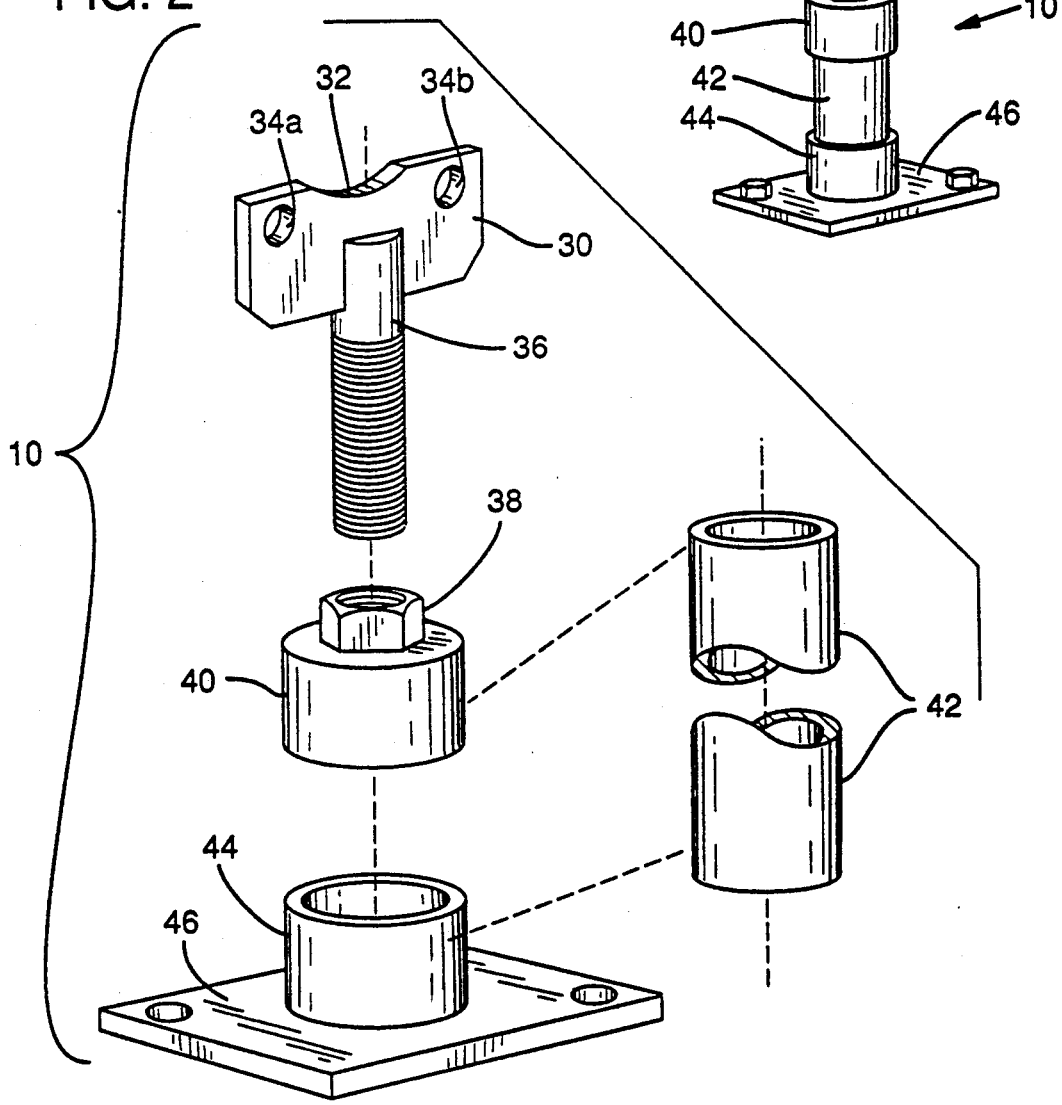
FIG. 2 is an exploded view of the pipe support of the present invention.

FIG. 2 is an exploded view of support 10, disclosing its structure. Rectangular plate 30 has in the upper edge thereof arcuate cutout 32, which is substantially parallel to the outside diameter of the pipe to be supported. Two bolt holes 34a and 34b, respectively, are fabricated into the upper edge of plate 30, at a spacing and with a diameter matching that of the bolt holes in the flanges of the pipes to be supported, as disclosed in FIG. 1 and discussed in connection therewith. Threaded stud 36 is welded or otherwise affixed to plate 30, and engages threaded nut 38, which is welded or otherwise affixed to inverted cup 40. Separator 42, preferably a length of standard water pipe as explained hereinabefore, which gives substantially the separation desired, is inserted between inverted cup 40 and cup 44, which is welded or otherwise affixed to base 46. Base 46 is fastened to a floor or other foundation to give solid support to the flanged piping.

The support of the present invention is depicted in its preferred embodiment of support from below the piping to be supported, and the weight thereof holds it all together. It is also the simplest.

However, if first and second cups 40 and 44 were threaded inside, and separator 42 were threaded on the outside of both ends thereof, the support could be used to hang flanged piping in any position. Separator 42 could include a standard coupling, which could be used to obtain the necessary fine adjustment in spacing.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What I claim as my invention is:

1. A pipe support for piping having flanges, said flanges having spaced holes for affixing sections of said piping together, comprising:
    1. a base having an upper surface thereon;
    2. a first cup fixedly attached to said upper surface;
    3. a separator, having a first end loosely fitting within said first cup;
    4. an inverted second cup loosely fitting over a second end of said separator, and having a threaded portion thereon;
    5. a plate having:
        a. a concave arcuately shaped upper edge;
        b. a lower edge having a threaded extension affixed thereto;
            i. said threaded extension engaging said threaded portion so that the separation between said upper edge and said base is adjustable; and
    6. said plate having therein spaced holes for bolting said plate to said flanges.

2. A pipe support, for supporting piping having flanges thereon, said flanges having therein spaced holes for bolting adjacent sections of said piping together, comprising:
    1. a base having an upper and a lower surface thereon;
    2. a first cup fixedly attached to said upper surface;
    3. a separator, having a first end and a second end, said first end slidably and rotatingly fitting inside said first cup;
    4. an inverted second cup slidably and rotatingly fitting over said second end, and having a threaded portion on the upper end thereof;
    5. a plate having:
        a. an upper and lower edge:
            i. said upper edge having a concave arcuate shape thereto;
            ii. said lower edge having affixed thereto a threaded extension;
                A. said threaded extension engaging said threaded portion so that when said second cup is rotated, the separation between said upper edge of said plate and said lower surface of said base is adjusted; and
    6. said plate having therein holes for bolting said plate to said flanges.

* * * * *